United States Patent [19]

Williams

[11] 4,203,305

[45] May 20, 1980

[54] FLEXIBLE COUPLING

[76] Inventor: Richard H. Williams, 18320-4 Oxnard St., Tarzana, Calif. 91356

[21] Appl. No.: 968,997

[22] Filed: Dec. 13, 1978

Related U.S. Application Data

[63] Continuation-in-part of Ser. No. 752,111, Dec. 20, 1976, abandoned, which is a continuation-in-part of Ser. No. 643,231, Dec. 22, 1975, abandoned, which is a continuation of Ser. No. 454,602, Mar. 25, 1974, abandoned.

[51] Int. Cl.$^2$ .............................................. F16D 3/52
[52] U.S. Cl. ................... 64/15 R; 64/15 B; 64/27 B; 64/27 S; 267/155; 267/167
[58] Field of Search .................. 64/15 R, 15 B, 15 C, 64/11 B, 27 B, 27 C, 27 S; 267/155, 167

[56] References Cited

U.S. PATENT DOCUMENTS

| | | |
|---|---|---|
| 1,429,580 | 9/1922 | Geiger .................................. 64/15 C |
| 2,043,152 | 6/1936 | Cook .................................... 64/15 R |
| 2,397,700 | 4/1946 | Sloan .................................... 64/15 R |
| 3,068,666 | 12/1962 | Sabadash ............................. 64/15 R |
| 3,390,546 | 7/1968 | Jewell .................................. 64/15 R |
| 3,448,591 | 6/1969 | Spyra ................................... 64/15 R |

Primary Examiner—Ira S. Lazarus
Assistant Examiner—Magdalen Moy
Attorney, Agent, or Firm—Robert R. Thornton

[57] ABSTRACT

A flexible coupling for torque transmission having a plurality of helical beams extending between the coupling ends, the helical beams having beam cross-sectional dimensions selected to provide equal stresses in operation at the inner and outer diameters of the beams, irrespective of direction of rotation and being of a ratio of depth to thickness to provide for substantially simultaneous failure in the buckling and elastic modes when rotated in a direction opposite the direction of beam spiral, whereby the load capacity of the coupling is independent of the direction of coupling rotation.

4 Claims, 4 Drawing Figures

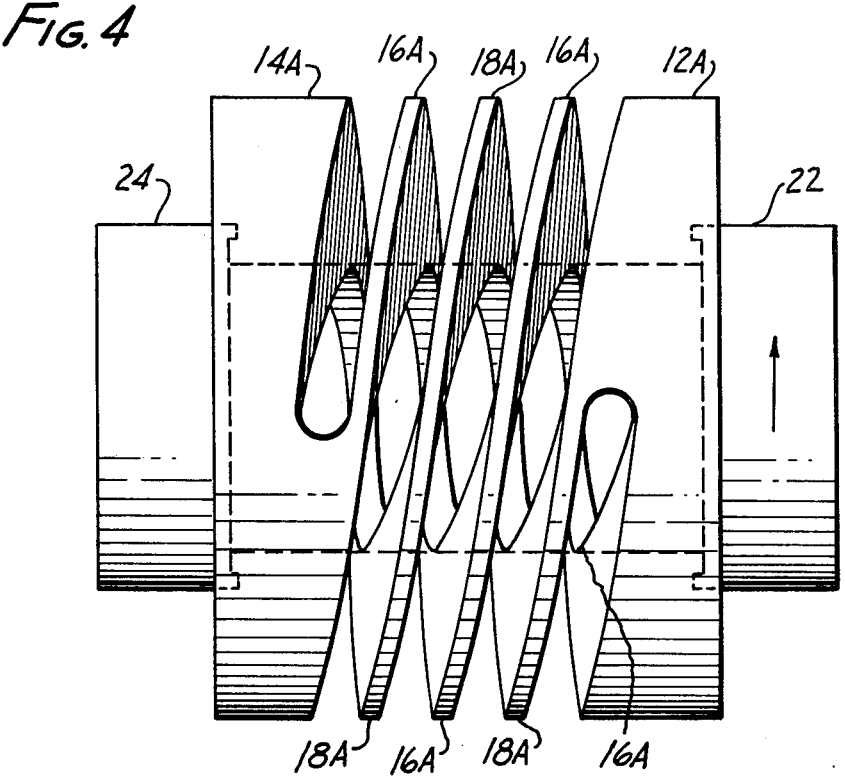
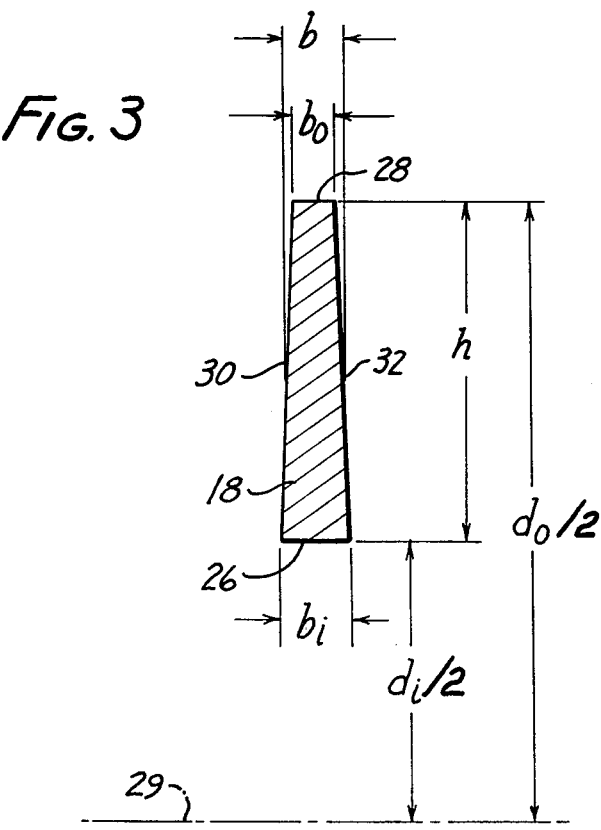

FLEXIBLE COUPLING

CROSS-REFERENCE TO RELATED APPLICATIONS

This application is a continuation-in-part of U.S. Pat. application Ser. No. 752,111, filed Dec. 20, 1976, now abandoned, which application was a continuation-in-part of U.S. Pat. application Ser. No. 643,231, filed Dec. 22, 1975, now abandoned, which application was a continuation of U.S. Pat. application Ser. No. 454,602, filed Mar. 25, 1974, now abandoned.

BACKGROUND OF THE INVENTION

1. Field of Invention.

This invention relates to a flexible coupling of the type utilized for interconnection between driving and driven rotating members where axial misalignment may be present.

2. Description of the Prior Art.

Flexible couplings of the general type to which the present invention pertains are well-known in the art and are illustrated, for example, in U.S. Pat. No. 3,068,666 issued Dec. 3, 1962 to George Sabadash, and U. S. Pat. No. 3,390,546 issued July 2, 1968 to Hollis Jewell. In the Sabadash patent, there is shown a flexible coupling utilizing a single helical beam between a pair of ends, and, in one embodiment, the beam has a rectangular cross-section with a depth greater than its thickness. In the Jewell patent, there is shown a flexible coupling with a plurality of helical beams, in which each of the helical beams extends less than three hundred and sixty degrees.

Devices according to each of these patents, while having wide-spread usage, are excessive in size and weight to compensate for improper cross-sectional geometry and/or material distribution by reason of the excess material, flexibility in such couplings is diminished. Such prior art couplings were all stronger when rotated opposite the direction of the helical spiral, the direction of rotation for which the coupling was primarily designed, than in the opposite direction of rotation. Consequently, either the coupling had to be rated differently according to the direction of rotation, or, if the coupling carried but a single rating, the rating was for a rotational direction in which the coupling could carry the smallest load. In certain instances, this problem was either ignored or not recognized in the prior art devices.

For a helical beam, because the beam length along the outer diameter is greater than the beam length along the inner diameter, for a constant thickness beam, failure in buckling normally will be initiated at the outer diameter. Such prior art couplings, in order to avoid failure of the buckling type, typically added material to the thickness of the beam, thereby decreasing the coupling flexibility and increasing the coupling weight. Height to thickness beam ratios of between 4 and 6 to 1 for such prior art couplings are typical.

If a large depth of thickness ratio for the coupling beam was used in order to increase the coupling flexibility when the coupling was rotated in the direction providing the greatest load carrying ability, predicting the load carrying capacity for such prior art couplings was complicated additionally. In such couplings, if a load was then applied in the opposite direction of rotation, a buckling type failure could occur at a load well below the elastic capability of the coupling.

SUMMARY OF THE INVENTION

According to the present invention, a flexible coupling whose load capacity is independent of the direction of coupling rotation in its preferred embodiment utilizes a plurality of helical beams of between 270° and 360° in angular length extending between the coupling ends. The preferred embodiment of the present invention is further characterized by the spiral direction of the helical beams being selected to spiral outwardly from the driving source in the opposite rotational sense from that in which the driving source normally rotates. The coupling of the preferred embodiment is characterized by the dimensional interrelationship of the diameter and thickness of the helical beams being expressed by the equation $$d_o d = (b_i/b_o)^{1.55}$$

wherein
- $d_o$ is the outer diameter of the helical beam;
- $d_i$ is the inner diameter of the helical beam;
- $b_o$ is the thickness of the beam at its outer diameter; and
- $b_i$ is the thickness of the beam at its inner diameter, in which thickness of the beam at the inner diameter of the helix is greater than the thickness at the outer diameter within a range of from 2:1 to about 3:1.

BRIEF DESCRIPTION OF THE DRAWING

The present invention may be more readily understood by referring to the accompanying drawing, in which:

FIG. 3 is a cross-section of a single beam; illustrating the relationship between depth and thickness of the helical beams of the coupling of FIG. 1; and FIG. 4 is a plan view of an alternate embodiment of flexible coupling.

DESCRIPTION OF THE PREFERRED EMBODIMENT

Figure 1:
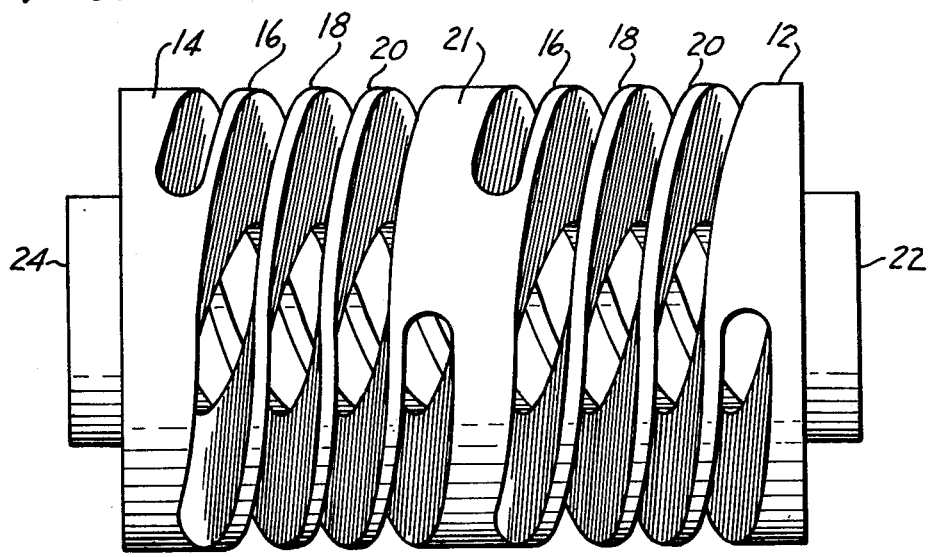
FIG. 1 is a plan view of a flexible coupling according to the present invention.

Referring now to FIG. 1, there is shown a flexible coupling 10 which consists of a pair of ends 12, 14, connected together by helical beams 16, 18, 20 and a central portion 21. Extending from the ends 12, 14 are drive shafts 22, 24, respectively, which may be attached to the ends 12, 14 by any conventional means. The direction of rotation of the coupling in normal operation is opposite to the direction of the spiral of the helical beams outwardly from the driving member, thereby insuring the imposition of compressive stress over the inner beam portions and of tensile stress over the outer beam portions in operation.

As seen in FIG. 1, each of the helical beams of the present invention is of slightly less than 360° in angular length. It has been found that beam lengths between 270° and 360° should be utilized in the practice of the invention. If beams of greater length are attempted to be utilized, higher order buckling modes will exist along the beam length, negating the simultaneous failure in buckling and elastic modes provided by the present invention when the coupling is rotated in the direction of the beam spiral. If beam lengths less than 270° are attempted to be utilized in the practice of the present invention, unfavorable beam loading due to bending of the coupling will result, again negating the simultaneous failure of the coupling in buckling and elastic modes when the coupling is rotated in the direction of the beam spiral. While a single array of helical beams may, in many instances, be utilized to provide the required coupling characteristics, such a device being shown in FIG. 4, when a single coupling element of beams of the specified length is insufficient, multiple couplings according to the present invention can be serially disposed along a common axis, as is shown in FIG. 1.

Figure 2:
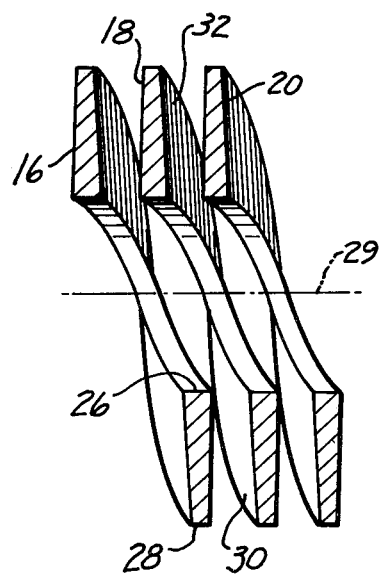
FIG. 2 is a partial cross-sectional view of a portion of the flexible coupling of FIG 1.

Referring now to FIG. 2, there is shown, in partial cross-section, a portion of the helical beams 18, 20, together with adjacent portions of the helical beam 16. In the preferred embodiment, each beam is of substantially isosceles trapezoidal cross-section. Thus, the beam 18 has an inner diameter face or portion 26 and an outer diameter face or portion 28 which are concentric about a common central axis 29 of the coupling 10. The diametrical faces 26, 28 abut lateral faces 30, 32 of the beam 18. Because, in the preferred embodiment, the inner diameter face 26 is greater in width (beam thickness) than the outer diameter face 28, the lateral faces 30, 32 are not parallel, but rather, are diverging in the direction of the central axis 29.

As is shown in FIG. 3, the helical beam 18 has a depth, defined as h, which is much greater than the mean beam thickness, defined as b. The depth h is one half the arithmetical difference between the diameter of the beam at its outer face, $d_o$, and the diameter of the beam at its inner face, $d_i$. The mean thickness b is one-half the sum of the thickness of the beam inner diameter face 26, designated as $b_i$, and the thickness of the beam outer diameter face 28, designated as $b_o$. The relative dimensions h and b shown in FIG. 3 are not to scale, but rather than the relative dimension for b has been greatly expanded in order to more clearly illustrate the definition of b.

To insure that normally the inner face is in compression and the outer face is in tension in operation, so that the buckling mode strength of the coupling greatly exceeds the elastic mode strength, the direction of spiral of the helical beams is selected to a rotational sense opposite to the rotational sense of the driving member. Thus, in operation, the coupling tends to wind up, rather than unwind. Then, when misalignment of the driving and driven members occurs, with the resultant alternating bending stress during rotation, the alternating bending stress is superimposed on the outer face 28 and its small tensile stress, thereby increasing, for a given coupling, the amount of misalignment at which the coupling will operate satisfactorily.

It has been found that, for optimal utilization of material in the flexible coupling, the ratio of h to b should be about 13.5. Such a ratio, when utilized in conjunction with the remainder of the present invention, will result in simultaneous failure, in normal usage, in both the elastic and buckling modes at the same torsional load. However, in practical operation, sudden stops and starts greatly increase the transient buckling load on the coupling. Therefore, in the preferred embodiment, a ratio of h to b of slightly less than 13.5 is utilized. For example, a typical range which provides for satisfactory operation is a ratio of from about 10 to about 12. However, if sudden stops and starts are not to be anticipated in the operation of the coupling, in the practice of the invention a ratio of 13.5 is preferable. Therefore, as used herein, the term "about 13.5" when utilized with respect to the ratio of depth to thickness is to be understood to comprehend, with respect to the particular application for the coupling, ratios of between about 10 and about 13.5.

It has been found that equal elastic mode stresses of the inner diameter face 26 and the outer diameter face 28, irrespective of the direction of rotation, are provided when the thickness $b_i$ and $b_o$ are selected to have a ratio of $b_i:b_o \geq 2 \leq 3$, and these parameters of the beam are defined by the equation $d_o/d_i = (b_i b_o)^{1.55}$. The stress at the inner face 26 in operation then equal to the stress at the outer face 28, whether a given face is in tensile or compressive load due to the direction of coupling rotation, irrespective of the direction of rotation.

When the coupling 10 rotates in the normal direction of rotation, the outer diameter is in tensile stress, and the coupling will, for any practical ratio of beam height, h, to thickness, b, fail in the elastic mode before failing in the buckling mode. If the direction of rotation is reversed, while the compressive stress at the outer diameter is still equal to the tensile stress at the inner diameter, conventional couplings will normally fail first in the buckling mode, as the coupling is weaker in the buckling mode when rotated in the direction of beam spiral than when rotated counter to the direction of beam spiral. As stated heretofore, conventional beams usually have a h/b ratio of from 4 to 6. However, according to the present invention, simultaneous failure in the buckling mode and in the elastic mode for a coupling rotated in the direction of the helical beam spiral is achieved by the preceding beam diameter and thickness relationships.

The cross-sectional configuration shown in FIG. 2 is that of an isosceles trapezoid. However, as is apparent by reason of the change in loading across the beam from normally compressive loading at the inner diameter face to normally tensile loading at the outer diameter face, points interjacent between the inner and outer faces all having a loading, either tensile or compressive, which is less than the corresponding maximum equal but opposite loadings at the faces. Consequently, excess material will exist along the beam height at these interjacent portions and, if desired, the longer sides of the trapezoid can be dish-shaped, concave, or be formed in other non-linear configurations, so long as the actual elastic mode loading does not exceed the elastic mode strength at any given point between the beam faces.

The invention claimed is:

1. A flexible coupling for torque transmission comprising
 a unitary structure having a pair of ends and drive shafts attached to the ends;
 a plurality of helical beams integral with one of said ends and extending to the other of said ends and being integral therewith, each of said beams being formed about a common axis so as to have an inner diameter face having a first predetermined thickness and an outer diameter face having a second predetermined thickness, and having a beam depth defined by the distance between the inner and outer faces of said beams, said beams spiralling outwardly from the one of said end to which a shaft to drive the coupling is to be attached, said spiral being in a first rotational sense which is opposite to a second rotational sense; and in which the ratio of thicknesses of the inner diameter faces to the outer diameter faces is selected to be within the range of from 2:1 to 3:1, the ratio of beam depth to mean beam thickness is about 13.5:1, and the depths and beam thicknesses are defined by the equation $$d_o/d_i = (b_i/b_o)^{1.55}$$

wherein
- $d_o$ is the outer diameter of the helical beam,
- $d_i$ is the inner diameter of the helical beam,
- $b_o$ is the thickness of the beam at its outer diameter,
- $b_i$ is the thickness of the beam at its inner diameter, and mean beam thickness is defined by $(b_i+b_o)/2$;

whereby the coupling will fail elastically and in buckling substantially simultaneously when rotated in the first rotational sense.

2. The coupling of claim 1, and in which the dimensions of the cross-section of each helical beam being selected in a ratio of between 10 to 13.5 of depth to thickness, whereby the elastic stress of the inner and outer diameter faces is equal and opposite, irrespective of the direction of rotation of the coupling.

3. The combination of claim 2, and in which the cross-sectional configuration of the beams is a quadrilateral.

4. The combination of claim 2, and in which the minimum thickness of the beam is in a plane located between the inner and outer diameter faces.

* * * * *

UNITED STATES PATENT AND TRADEMARK OFFICE
CERTIFICATE OF CORRECTION

PATENT NO.   : 4,203,305
DATED        : May 20, 1980
INVENTOR(S)  : Richard H. Williams It is certified that error appears in the above-identified patent and that said Letters Patent are hereby corrected as shown below:

| | |
|---|---|
| Col. 1, line 24 | "3068,666" should read "3,068,666" |
| Col. 1, line 25 | "Dec. 3, 1962" should read "Dec. 13, 1962" |
| Col. 1, line 62 | The "of" should read "to" |
| Col. 2, line 20 | "$d_o d=$" should read "$d_o/d_i=$" |
| Col. 2, line 30 | Insert "about" after "from" |
| Col. 3, line 19 | Insert a space between "has" and "an" |
| Col. 3, line 38 | Delete the word "than" after "rather" |
| Col. 4, line 12 | "$(b_i b_o)^{1.55}$" should read "$(b_i/b_o)^{1.55}$" |

Signed and Sealed this

Twenty-ninth Day of July 1980

[SEAL]

Attest:

Attesting Officer

SIDNEY A. DIAMOND

Commissioner of Patents and Trademarks